US009037158B2

(12) United States Patent
Wachter et al.

(10) Patent No.: US 9,037,158 B2
(45) Date of Patent: May 19, 2015

(54) LOCALIZED SECURE USER PLANE LOCATION (SUPL) EMERGENCY SESSION

(71) Applicant: QUALCOMM Incorporated, San Diego, CA (US)

(72) Inventors: Andreas Wachter, Menlo Park, CA (US); Ie-Hong Lin, Cupertino, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 70 days.

(21) Appl. No.: 13/786,291

(22) Filed: Mar. 5, 2013

(65) Prior Publication Data

US 2014/0256282 A1    Sep. 11, 2014

(51) Int. Cl.

| H04W 24/00 | (2009.01) |
|---|---|
| H04W 76/00 | (2009.01) |
| H04W 4/02 | (2009.01) |
| H04W 4/20 | (2009.01) |
| H04W 4/22 | (2009.01) |
| H04L 29/08 | (2006.01) |

(52) U.S. Cl.
CPC .............. *H04W 76/007* (2013.01); *H04W 4/02* (2013.01); *H04W 4/20* (2013.01); *H04W 4/22* (2013.01); *H04L 67/143* (2013.01)

(58) Field of Classification Search
CPC ... H04W 76/007; H04W 76/02; H04W 76/04; H04W 76/06; H04W 64/003; H04W 4/025; H04W 4/04; H04W 4/20; H04W 4/22
USPC .......... 455/404.1, 404.2, 414.1, 456.1, 456.2, 455/456.3, 456.5
See application file for complete search history.

(56) References Cited

U.S. PATENT DOCUMENTS

| 8,254,877 B2 | 8/2012 | Edge et al. |
|---|---|---|
| 8,301,160 B2 | 10/2012 | Thomson et al. |
| 2006/0172720 A1 | 8/2006 | Islam et al. |
| 2008/0009262 A1 | 1/2008 | Rudolf et al. |

(Continued)

FOREIGN PATENT DOCUMENTS

| WO | WO-2007016695 A2 | 2/2007 |
|---|---|---|
| WO | WO-2007043753 A1 | 4/2007 |

OTHER PUBLICATIONS

International Search Report and Written Opinion—PCT/US2014/019901—ISA/EPO—Jun. 6, 2014.

(Continued)

*Primary Examiner* — Jean Gelin
(74) *Attorney, Agent, or Firm* — Kilpatrick Townsend & Stockton LLP

(57) ABSTRACT

Methods, systems, computer-readable media, and apparatuses for a Localized Secure User Plane Location (SUPL) Emergency Session are presented. In some embodiments, a method for a localized Secure User Plane Location Emergency Session includes receiving a Secure User Plane Location Initiation Message at a mobile device; determining whether an emergency indicator in the Secure User Plane Location Initiation Message is set to TRUE; determining a Mobile Country Code associated with the radio access network currently used by the mobile device; determining a requirement for an Emergency Secure User Plane Location Session in a jurisdiction associated with the Mobile Country Code; and establishing a Secure User Plane Location Session with a Secure User Plane Location Platform server.

24 Claims, 3 Drawing Sheets

(56) References Cited

U.S. PATENT DOCUMENTS

| | | |
|---|---|---|
| 2008/0064380 A1* | 3/2008 | Niemenmaa et al. ...... 455/414.2 |
| 2008/0233931 A1 | 9/2008 | Shim |
| 2009/0124267 A1* | 5/2009 | del Castillo ................ 455/456.6 |
| 2009/0253403 A1 | 10/2009 | Edge et al. |
| 2011/0096769 A1* | 4/2011 | Sim .............................. 370/352 |
| 2011/0287733 A1 | 11/2011 | Cepuran et al. |
| 2012/0178411 A1 | 7/2012 | Li et al. |
| 2012/0202517 A1 | 8/2012 | Edge et al. |
| 2013/0324154 A1* | 12/2013 | Raghupathy et al. ...... 455/456.1 |
| 2014/0086147 A1* | 3/2014 | Narkar et al. ................. 370/328 |
| 2014/0189112 A1* | 7/2014 | Zhu et al. ...................... 709/224 |

OTHER PUBLICATIONS

"User Plane Location Protocol; OMA-TS-ULP-V3 0-201-20718-D", OMA-TS-ULP-V3-0-20120718-D, Open Mobile Alliance (OMAT, 4330 La Jolla Village Dr., Suite 110 San Diego, CA 92122 ; USA, No. 3.0, Jul. 18, 2012, pp. 1-290, Retrieved from the Internet: URL:ftp/Public documents/LOC/Permanent documents/.

\* cited by examiner

US 9,037,158 B2

LOCALIZED SECURE USER PLANE LOCATION (SUPL) EMERGENCY SESSION

BACKGROUND

Aspects of the disclosure relate to location determination using a Secure User Plane Location (SUPL) emergency session. SUPL is a location solution developed by the Open Mobile Alliance (OMA), which can enable use of AGPS and other positioning methods such as AFLT, OTDOA and ECID. SUPL includes the ability to provide the location of a user during an emergency call. But the requirements for emergency calls vary from nation to nation. The present disclosure contemplates a solution that allows SUPL Enabled mobile devices to comply with the regulatory requirements of multiple jurisdictions.

BRIEF SUMMARY

Certain embodiments are described that provide a Localized Secure User Plane Location (SUPL) Emergency Session. For example, in one embodiment, a method includes, receiving a Secure User Plane Location Initiation Message at a mobile device; determining whether an emergency indicator in the Secure User Plane Location Initiation Message is set to TRUE; determining a Mobile Country Code associated with the mobile device; determining requirements for an Emergency Secure User Plane Location Session in a jurisdiction associated with the Mobile Country Code; and establishing a Secure User Plane Location Session with a Secure User Plane Location Platform server.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
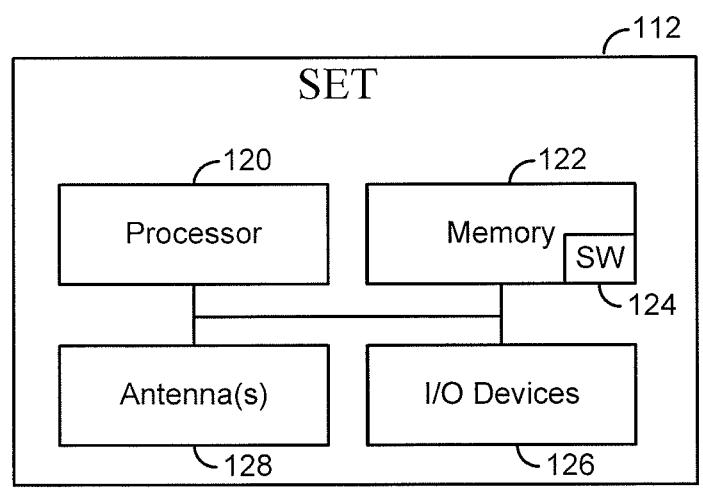
FIG. 1 illustrates a simplified diagram of a system that may incorporate one or more embodiments.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

SUPL is a user plane positioning protocol which utilizes positioning technologies such as for example Assisted GPS (AGPS) that was developed by the Open Mobile Alliance (OMA). The SUPL architecture is composed of two basic elements: a SUPL Enabled Terminal (SET) and a SUPL Location Platform (SLP). The SET is a mobile device, such as a phone, PDA, tablet computer, or other device, which has been configured to support SUPL transactions. The SLP is a server or network equipment stack that represents the counterpart of the SET in the network and that conducts a SUPL session with a SET. An SLP handles tasks not only associated with positioning but also with user authentication and authorization, charging, and roaming.

SUPL versions 2.0 and later (e.g. SUPL 2.0, 2.1, and SUPL 3.0) allow for emergency call positioning. That is, these SUPL versions allow an emergency operator (e.g. in the United States a PSAP) to use SUPL to determine the location of a SUPL enabled mobile device that placed the call. To indicate to the SET that a SUPL initiation message is related to an emergency call positioning (as opposed to a regular commercial location based service SUPL session), the SUPL initiation message (SUPL INIT) has its emergency indicator set to TRUE. In some embodiments, this emergency SUPL INIT message is called an ES SUPL INIT message.

The requirements for emergency calls vary from country to country. For example, in the United States the emergency number is 911, and in the United States a SUPL enabled mobile device is allowed to engage in an emergency positioning session using SUPL only while an emergency call is in process. Thus, as soon as the emergency call ends, incoming ES SUPL NIT messages will no longer be accepted and processed by the mobile device i.e., the request for an emergency SUPL session would be ignored.

In contrast, in Japan the emergency number is 119, and local regulatory requirements stipulate that a SUPL enabled mobile device must be able to engage in an emergency positioning session using SUPL not only as long as the mobile device is in an emergency call, but also during a specific period of time (e.g., 20 seconds) after the emergency call is concluded.

Thus, a system that is designed to deal with the emergency positioning sessions using SUPL in the United States may not be able to also deal with emergency positioning sessions using SUPL in Japan. The present disclosure contemplates a solution that allows mobile devices to comply with the regulatory requirements of multiple jurisdictions, without physical modifications to the system.

In one embodiment of the present disclosure, a mobile device may comprise software that, prior to engaging in a SUPL emergency session, checks the Mobile Country Code (MCC) of the radio access network currently in use. In some embodiments, the MCC is part of the International Mobile Subscriber Identity (IMSI) number, used in combination with a Mobile Network Code (MNC) (also known as a "MCC/MNC tuple") to uniquely identify a mobile phone operator/carrier using one of a plurality of known telephone networks. This enables the device to determine the country in which the device is currently located (e.g. an MCC of 310-316 indicates the device is in the United States, whereas an MCC of 440 or 441 indicates that the device is in Japan). Based on this information and taking into consideration the dialed number, the mobile device can determine whether it is currently making an emergency call and, if so, allow the device to select the country specific SUPL emergency session behavior.

Accordingly, in one embodiment of the present disclosure a user may dial 911 with his or her mobile device while in the United States. When the user places this call, software on the mobile device may determine that the user is in the United States based on the MCC code (i.e. by determining if the MCC code is from 310-316). Further, the device may determine that the user has dialed an emergency number (i.e. by detecting that the user has dialed 911). Based on these factors, the device may check a data store for the requirements for SUPL emergency sessions in the United States. After checking these requirements the device may accept an incoming ES SUPL INIT from the SUPL server. And in compliance with these requirements, as soon as the user hangs up, the device may ignore any additional ES SUPL INIT messages as long as the user is not in an emergency call.

In another embodiment of the present disclosure, a user may dial 119 with his or her mobile device while in Japan. When the user places this call, software on the mobile device may determine that the user is in Japan based on the MCC code (i.e. by determining if the MCC code is 440 or 441). Further, the device may determine that the user has dialed an emergency number (i.e. by detecting that the user has dialed 119). Based on these factors, the device may check the requirements for SUPL emergency sessions in Japan. Thus, the device may accept an incoming ES SUPL INIT from the SUPL server. Furthermore, once the user hangs up the device may continue to process any further received incoming ES SUPL INIT messages for a fixed period of time (e.g. 20 seconds) in compliance with Japanese regulatory requirements.

Turning now to the Figures, FIG. 1, an example of a SUPL Enabled Terminal (SET) 112 is shown. In some embodiments SET 112 may be a smartphone, a mobile phone, a tablet computer, a portable organizer, a portable device, or other type of electronic device known in the art. As shown in FIG. 1, SET 112 comprises a computer system including a processor 120, memory 122 including software 124, input/output (I/O) device(s) 126 (e.g., a display, speaker, keypad, touch screen or touchpad, etc.) and one or more antennas 128.

In the embodiment shown in FIG. 1, the processor 120 is an intelligent hardware device, e.g., a central processing unit (CPU) such as those made by Intel® Corporation, AMD®, or Qualcomm® a microcontroller, an application specific integrated circuit (ASIC), etc.

Further, in the embodiment shown in FIG. 1, the memory 122 includes non-transitory storage media such as random access memory (RAM) and read-only memory (ROM). The memory 122 stores the software 124 which is computer-readable, computer-executable software code containing instructions that are configured to, when executed, cause the processor 120 to perform various functions described herein. Alternatively, the software 124 may not be directly executable by the processor 120 but is configured to cause the computer, e.g., when compiled and executed, to perform the functions In the embodiment shown in FIG. 1, the antenna(s) 128 provide communication functionality for the SET 112 and facilitate bi-directional communication with base stations or other devices. In some embodiments, the antenna(s) may also enable reception and measurement of SPS signals—e.g. signals from a GPS satellite. The antenna(s) 128 can operate based on instructions from a transmitter and/or receiver module, which can be implemented via the processor 120 (e.g., based on software 124 stored on memory 122) and/or by other components of the SET 112 in hardware, software, or a combination of hardware and/or software.

Figure 2:
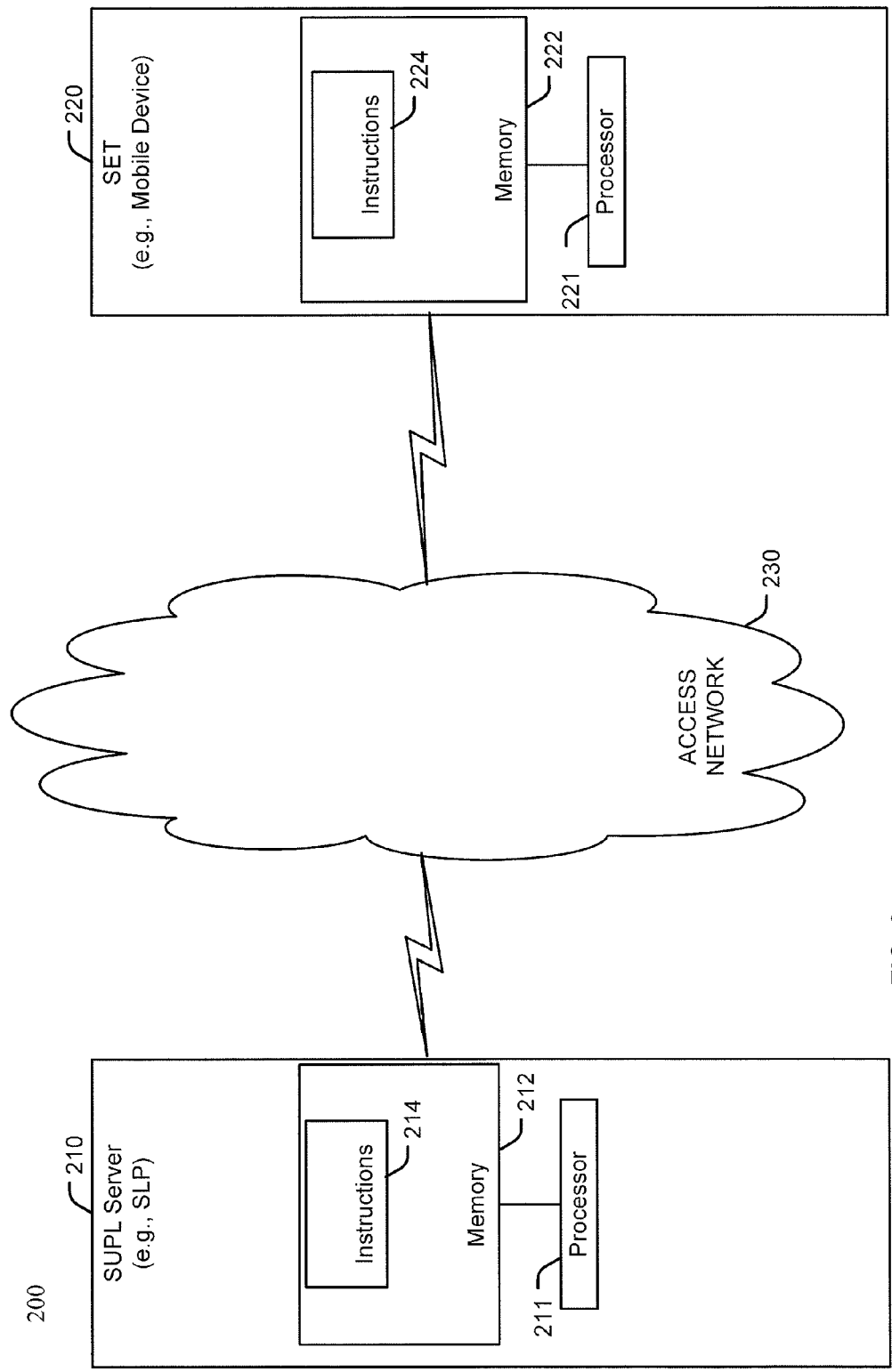
FIG. 2 illustrates a schematic diagram of a wireless telecommunication system that may incorporate one or more embodiments.

Referring now to FIG. 2, a particular embodiment of a system that is operable to Localize Secure User Plane Location (SUPL) Emergency Sessions is shown and generally designated 200. The system 200 includes a SUPL server 210 communicably coupled to a SET 220 (e.g. a mobile device) via one or more access networks (e.g., an illustrative access network 230) and possibly also via one or more transit networks (not shown in FIG. 2).

In one embodiment of the system shown in FIG. 2, the SUPL server 210 may be a SUPL location platform (SLP) and the mobile device 220 may be a SUPL-enabled terminal (SET). In such an embodiment, the access network 230 may be a 3GPP network (e.g., GSM/WCDMA/LTE), a 3GPP2 network (e.g., CDMA 2000), a WiMAX network, a Wi-Fi network (e.g., a network that operates in accordance with an IEEE 802.11 standard), or some other wireless access network. In a particular embodiment, the mobile device 220 may be a smartphone.

In one embodiment, the SUPL server 210 may include a processor 211 and a memory 212 coupled to the processor 211. In a particular embodiment, the memory 212 may store instructions 214 executable by the processor 211, where the instructions represent various logical modules, components, and applications. For example, the memory 212 may store computer-readable, computer-executable software code containing instructions that are configured to, when executed, cause the processor 211 to perform various functions described herein. The memory 212 may also store one or more security credentials of the SUPL server 210.

In one embodiment, the mobile device 220 may comprise a mobile device of the type described with regard to FIG. 1. In some embodiments, the mobile device 220 may comprise a processor 221 and a memory 222 coupled to the processor 221. In a particular embodiment, the memory 222 stores instructions 224 executable by the processor 221, where the instructions may represent various logical modules, components, and applications. For example, the memory 222 may store computer-readable, computer-executable software code containing instructions that are configured to, when executed, cause the processor 211 to perform various functions described herein. The memory 222 may also store one or more security credentials of the mobile device 220.

Figure 3:
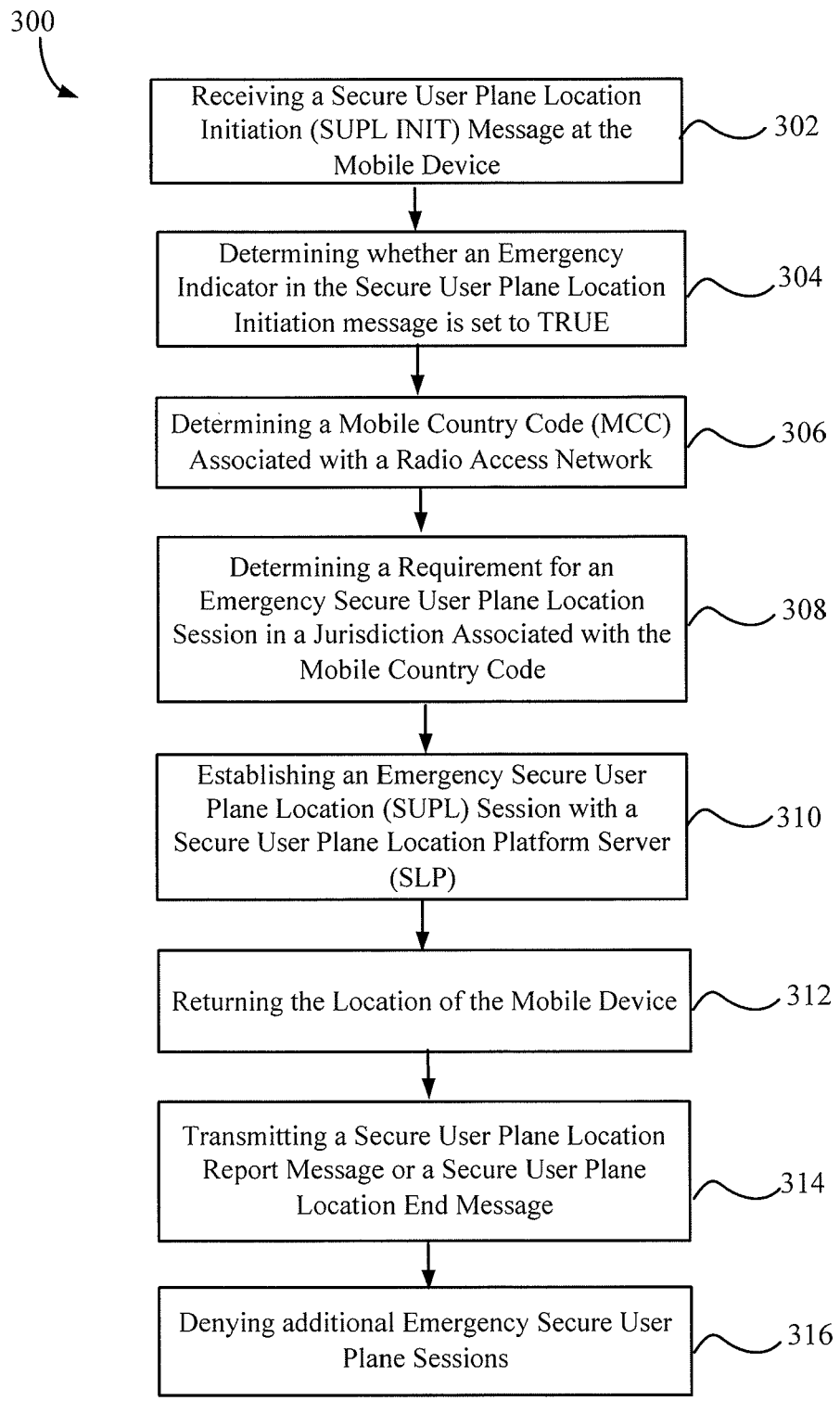
FIG. 3 illustrates a flow chart describing an exemplary embodiment for a Localized Secure User Plane Location (SUPL) Emergency Session.

Referring now to FIG. 3, FIG. 3 is a flow chart describing an exemplary embodiment for a method to Localize Secure User Plane Location (SUPL) Emergency Sessions. In some embodiments, the stages in FIG. 3 may be implemented in program code that is executed by a processor, for example, the processor in a general purpose computer, a mobile device, or a server. In some embodiments, these stages may be implemented by a group of processors, for example, a processor on a mobile device and processors on one or more general purpose computers, such as servers.

Discussion below of step numberings or orderings, such as by use of the words "first," "next," "then," or "last" is only for the convenience of discussing each of the steps. No ordering of steps or processing should be inferred from such numberings or orderings.

As shown in FIG. 3, the method 300 starts at stage 302 when a SUPL enabled mobile device receives a Secure User Plane Location Session Initiation Message (SUPL INIT). In some embodiments of the present disclosure, this is a network initiated SUPL Session, thus, the SUPL INIT is sent from the SLP to the mobile device (SET). In some embodiments, the SUPL INIT message is the first SUPL message sent to the mobile device (SET) by an SLP when instigating any SUPL session with the mobile device—e.g. to obtain the location of the mobile device. In some embodiments, the SUPL INIT message contains the intended positioning method (posMethod), the SLP Capabilities (sLPCapabilities), and the QoP (quality of position).

Next at stage 304 the mobile device (SET) determines whether an emergency indicator in the SUPL INIT is set to TRUE. In some embodiments, determining whether the emergency indicator is set to TRUE may comprise determining if the mobile device has received an ES SUPL INIT.

Next at stage 306, the mobile device determines a Mobile Country Code (MCC) associated with the current radio access network. Each country has a unique MCC code, or set of MCC codes. Thus, using the MCC code enables a device to determine the country in which the device is currently located (e.g. an MCC of 310-316 indicates the device is in the United States, whereas an MCC of 440 or 441 indicates that the device is in Japan). Further in some embodiments, the mobile device may determine the type of location determination to use. For example, in one embodiment, the mobile device may determine to use either SUPL or CP based in part on the MCC code associated with the current radio access network.

Then at stage 308, the mobile device determines the requirements for an EMERGENCY SUPL Session in a jurisdiction associated with the MCC code of the radio access network. In some embodiments this may comprise checking a database configured to store requirements associated with EMERGENCY SUPL Sessions. In some embodiments, this database may be stored on a local data store, e.g. memory 122 described with regard to FIG. 1. In other embodiments, the database may comprise a remote database, e.g., a remote database stored at a remote server accessible via a data networks such as the Internet. In some embodiments, the requirements associated with EMERGENCY SUPL Sessions stored in either a remote database or in a local data store may be updated periodically, for example, when the requirements change in a certain number of jurisdictions.

In some embodiments, determining the requirements for an EMERGENCY SUPL Session in a jurisdiction associated with the MCC code of the radio access network according to stage 308 comprises determining whether the mobile device has dialed an emergency number in a jurisdiction. In some embodiments, this may comprise comparing a dialed number to a database of emergency numbers (e.g. 911 in the United States and 119 in Japan). In some embodiments, the database may be stored in a local data store, e.g. memory 122 described with regard to FIG. 1. In other embodiments, this may comprise checking a remote database, e.g., a remote database stored at a remote server accessible via a data network such as the internet. In some embodiments, the database may be updated periodically, for example, if the emergency number changes in one jurisdiction, or if a jurisdiction adds a new emergency number.

If the requirements for an emergency SUPL session in the jurisdiction associated with the MCC (as per stage 308) are met, then at sage 310, the mobile device establishes an Emergency Secure user Plane Location (SUPL) Session with a Secure User Plane Location Platform (SLP) server. In some embodiments, during the SUPL session, the mobile device obtains its (SET) location via SUPL interaction with the SLP. In some embodiments, this may comprise performing location measurements as directed by the SLP or as decided by the mobile device. In other embodiments the mobile device may not obtain its location and instead only the SLP will obtain the mobile device's location.

Then at stage 312, the location of the mobile device is determined. In some embodiments, this position may be the position determined during the SUPL Session. In some embodiments the location may be calculated by the mobile device. In other embodiments, the location may be calculated by the SLP. In some embodiments, the location is returned to a requesting entity such as a Public-Safety Answering Point (PSAP). In some embodiments, the location is returned to the PSAP as soon as a position fix has been successfully obtained. In still other embodiments, the location may be returned to one or more emergency service providers in the mobile device's present jurisdiction.

Next at stage 314, a SUPL REPORT or a SUPL END is transmitted. In some embodiments, this message may indicate that the location session has ended. In some embodiments, the SUPL End message may include the result of the location determination discussed above.

Then at stage 316, the mobile device no longer accepts additional Emergency Secure User Plane Location (SUPL) Sessions. In some embodiments, the mobile device only denies additional Emergency SUPL Sessions if the device is no longer connected to the emergency number. In further embodiments, this step may comprise denying additional Emergency SUPL Sessions only after a predetermined period of time (e.g. 10, 20, or 30 seconds) after the Emergency call has ended. In some embodiments, this behavior is dictated by the requirements of the jurisdiction associated with the MCC.

Embodiments of the present disclosure provide advantages over, for example, a solution that hardwires SUPL behavior, because such a hardwired solution will not function in multiple jurisdictions. For example, a hardwired device could not comply with regulatory requirements in both the United States and in Japan, because these requirements require conflicting operations. Thus, embodiments of the present disclosure enable SUPL Platforms to be deployed worldwide, and further allow interoperability between mobile devices for emergency numbers in each of these locations.

Further, embodiments of the present disclosure increase usability of Emergency SUPL services. For example, embodiments of the present disclosure enable mobile devices to better comply with jurisdiction's regulatory requirements for Emergency SUPL sessions. Thus, embodiments of the present disclosure may increase adoption of SUPL, and make it easier to locate users in emergency situations. This may ultimately save lives of users in emergency situations.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method for a localized Secure User Plane Location Session comprising:
   receiving a Secure User Plane Location Initiation Message (SUPL INIT) at a radio access network currently used by a mobile device;
   determining whether an emergency indicator in the Secure User Plane Location Initiation Message is set to TRUE;
   determining a Mobile Country Code associated with the radio access network;
   determining a requirement for an Emergency Secure User Plane Location Session in a jurisdiction associated with the Mobile Country Code; and
   in response to determining the requirement for the Emergency Secure User Plain Location Session in the jurisdiction associated with the Mobile Country Code, establishing a Secure User Plane Location Session with a Secure User Plane Location Platform server.

2. The method of claim 1, further comprising determining whether the mobile device has dialed an emergency number in the jurisdiction.

3. The method of claim 2, further comprising denying additional Emergency Secure User Plane Location Sessions if the mobile device is no longer connected to the emergency number.

4. The method of claim 3, wherein the mobile device denies additional Emergency Secure User Plane Location Sessions only after a predetermined period after the mobile device is no longer connected to the emergency number.

5. The method of claim 1, further comprising returning a location of the mobile device.

6. The method of claim 5, further comprising, transmitting a Secure User Plane Location Report Message or a Secure User Plane Location End Message to the SLP.

7. An apparatus for a localized Secure User Plane Location Session comprising:
   one or more antennas configured to receive a Secure User Plane Location Initiation Message (SUPL INIT) at a radio access network currently used by a mobile device;
   a processor in communication with the one or more antennas and configured to:
      determine whether an emergency indicator in the Secure User Plane Location Initiation Message is set to TRUE;
      determine a Mobile Country Code associated with a radio access network;
      determine a requirement for an Emergency Secure User Plane Location Session in a jurisdiction associated with the Mobile Country Code; and
      in response to determining the requirement for the Emergency Secure User Plain Location Session in the jurisdiction associated with the Mobile Country Code, establish a Secure User Plane Location Session with a Secure User Plane Location Platform server.

8. The apparatus of claim 7, wherein the processor is further configured to determine whether the mobile device has dialed an emergency number.

9. The apparatus of claim 8, wherein the processor is further configured to deny additional Emergency Secure User Plane Location Sessions if the mobile device is no longer connected to the emergency number.

10. The apparatus of claim 9, wherein the processor is configured to deny additional Emergency Secure User Plane Location Sessions only after a predetermined period after the mobile device is no longer connected to the emergency number.

11. The apparatus of claim 7, wherein the processor is further configured to, return a location of the mobile device.

12. The apparatus of claim 11, wherein the processor is further configured to, transmit a Secure User Plane Location Report Message or a Secure User Plane Location End Message.

13. A computer readable medium comprising program code, which when executed by a processor is configured to cause the processor to:
  receive a Secure User Plane Location Initiation Message (SUPL INIT) at a radio access network currently used by a mobile device;
  determine whether an emergency indicator in the Secure User Plane Location Initiation Message is set to TRUE;
  determine a Mobile Country Code associated with the radio access network;
  determine a requirement for an Emergency Secure User Plane Location Session in a jurisdiction associated with the Mobile Country Code; and
  in response to determining the requirement for the Emergency Secure User Plain Location Session in the jurisdiction associated with the Mobile Country Code, establish a Secure User Plane Location Session with a Secure User Plane Location Platform server.

14. The computer readable medium of claim 13, further comprising program code, which when executed by a processor, is configured to cause the processor to: determine whether the mobile device has dialed an emergency number.

15. The computer readable medium of claim 14, further comprising program code, which when executed by a processor, is configured to cause the processor to: deny additional Emergency Secure User Plane Location Sessions if the mobile device is no longer connected to the emergency number.

16. The computer readable medium of claim 15, wherein the denying additional Emergency Secure User Plane Location Sessions occurs only after a predetermined period after the mobile device is no longer connected to the emergency number.

17. The computer readable medium of claim 13, further comprising program code, which when executed by a processor, is configured to cause the processor to: return a location of the mobile device.

18. The computer readable medium of claim 17, further comprising program code, which when executed by a processor, is configured to cause the processor to: transmit a Secure User Plane Location Report Message or a Secure User Plane Location End Message.

19. An apparatus for a localized Secure User Plane Location Session comprising:
  means for receiving a Secure User Plane Location Initiation Message (SUPL INIT) at a radio access network currently used by a mobile device;
  means for determining whether an emergency indicator in the Secure User Plane Location Initiation message is set to TRUE;
  means for determining a Mobile Country Code associated with the radio access network;
  means for determining a requirement for an Emergency Secure User Plane Location Session in a jurisdiction associated with the Mobile Country Code; and
  means for establishing, in response to determining the requirement for the Emergency Secure User Plain Location Session in the jurisdiction associated with the Mobile Country Code, a Secure User Plane Session with a Secure User Plane Location Platform server.

20. The apparatus of claim 19, further comprising a means for determining whether the mobile device has dialed an emergency number.

21. The apparatus of claim 20, further comprising a means for denying additional Emergency Secure User Plane Location Sessions if the mobile device is no longer connected to the emergency number.

22. The apparatus of claim 21, wherein the means for terminating is configured to deny additional Emergency Secure User Plane Location Sessions only after a predetermined period after the mobile device is no longer connected to the emergency number.

23. The apparatus of claim 19, further comprising a means for returning a location of a mobile device.

24. The apparatus of claim 23, further comprising a means for transmitting a Secure User Plane Location Report Message or a Secure User Plane Location End Message.

* * * * *